United States Patent
Fukuda et al.

(10) Patent No.: US 12,304,269 B2
(45) Date of Patent: May 20, 2025

(54) STABILIZER ASSEMBLY AND AN OFF-ROAD VEHICLE WITH THE STABILIZER ASSEMBLY

(71) Applicant: KANZAKI KOKYUKOKI MFG. CO., LTD., Amagasaki (JP)

(72) Inventors: Toshiyuki Fukuda, Amagasaki (JP); Yuki Hashimoto, Amagasaki (JP); Keith J. Andrews, Morristown, TN (US)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/173,368

(22) Filed: Feb. 23, 2023

(65) Prior Publication Data

US 2023/0302868 A1    Sep. 28, 2023

Related U.S. Application Data

(60) Provisional application No. 63/323,213, filed on Mar. 24, 2022.

(51) Int. Cl.
 *B60G 21/055* (2006.01)
 *F16D 11/10* (2006.01)

(52) U.S. Cl.
 CPC .......... *B60G 21/0556* (2013.01); *F16D 11/10* (2013.01); *B60G 2202/135* (2013.01);
 (Continued)

(58) Field of Classification Search
 CPC ........ F16D 2011/002; B60G 2202/135; B60G 21/0556; B60G 2206/427; B60G 21/0553;
 (Continued)

(56) References Cited

U.S. PATENT DOCUMENTS 5,538,264 A * 7/1996 Brown ..................... B60G 9/00
                                                         280/503
6,428,019 B1    8/2002 Kincad et al.
(Continued)

FOREIGN PATENT DOCUMENTS

CN        106080091 A  * 11/2016  ......... B60G 21/0556
DE   102009054671 A1  *  6/2001  ......... B60G 21/0556
(Continued)

OTHER PUBLICATIONS

Sakurai , Stabilizing Device for Vehicular Suspension, Oct. 17, 2000, EPO, JP 2000289427 A, Machine Translation of Description (Year: 2000).*

(Continued)

*Primary Examiner* — Paul N Dickson
*Assistant Examiner* — Matthew D Lee
(74) *Attorney, Agent, or Firm* — CANTOR COLBURN LLP

(57) ABSTRACT

Provided is a stabilizer assembly that allows a coupling member to make smooth slide movement. To this end, a stabilizer assembly for a vehicle comprises; a first stabilizer, a second stabilizer, and a clutch mechanism. The clutch mechanism includes a clutch case; a first engagement portion; a second engagement portion; an engagement slider; an actuator; a first protrusion; a second protrusion; and a collar fitted on outer peripheral surfaces of the first and second protrusions across a mating point thereof while the first and the second protrusions are set their front ends butted against each other, the collar having an outer diameter size not exceeding a size of the groove-bottom diameter of the engagement grooves.

4 Claims, 10 Drawing Sheets

(52) U.S. Cl.
CPC .. *B60G 2204/82* (2013.01); *B60G 2204/8302* (2013.01); *B60G 2300/07* (2013.01)

(58) Field of Classification Search
CPC .... B60G 2200/422; B60G 3/24; B60K 17/34; B60K 17/348
See application file for complete search history.

(56) References Cited

U.S. PATENT DOCUMENTS

2008/0106055 A1* 5/2008 Pinkos ................. F16D 27/118
            280/124.106
2022/0332185 A1* 10/2022 Pultz ................... B60K 17/046

FOREIGN PATENT DOCUMENTS

| JP | 2000289427 A | * | 10/2000 | ......... B60G 21/0553 |
| WO | WO-2020018900 A1 | * | 1/2020 | ......... B60G 21/0555 |

OTHER PUBLICATIONS

Sakurai, Stabilizing Device for Vehicular Suspension, Oct. 17, 2000, EPO, JP 2000289427 A, Machine Translation of Description (Year: 2000).*

* cited by examiner

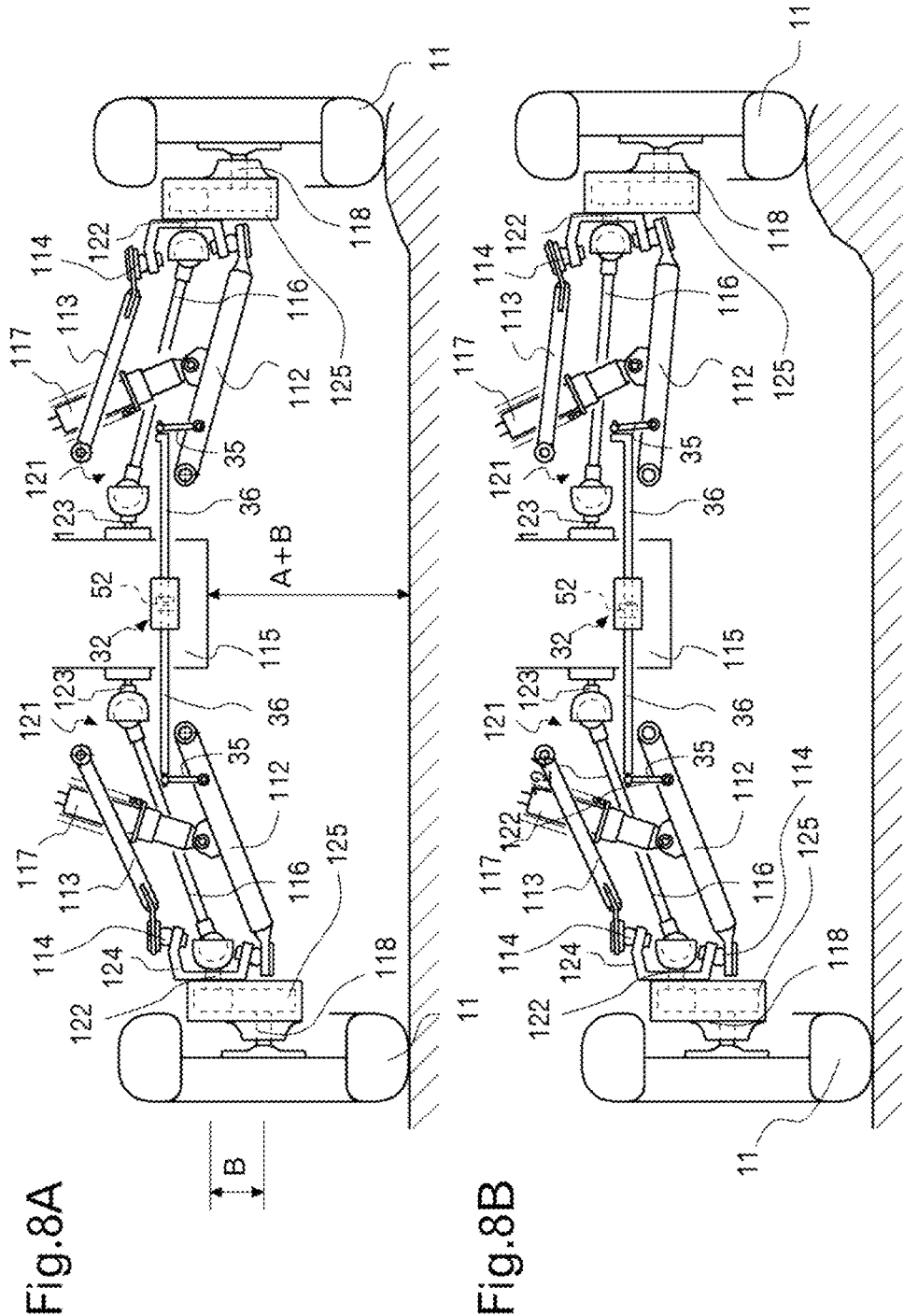

STABILIZER ASSEMBLY AND AN OFF-ROAD VEHICLE WITH THE STABILIZER ASSEMBLY

CROSS REFERENCE TO PRIOR APPLICATIONS

The present application claims priority to U.S. Provisional Application No. 63/323,213, filed on Mar. 24, 2022, the entire contents of which are incorporated herein by reference.

BACKGROUND

Field of the Invention

At least one embodiment according to the present invention relates to a stabilizer assembly and to an off-road vehicle including the stabilizer assembly, and particularly relates to a stabilizer assembly included in an off-road vehicle equipped with a pair of wheels, the stabilizer assembly including a pair of stabilizers attached in such a way as to be couplable to and independent of each other to control rolling of the vehicle, and to an off-road vehicle including the stabilizer assembly.

Stabilizer assemblies have been around for years, one example of which is a stabilizer assembly used to control rolling of an off-road vehicle. The stabilizer assembly includes a pair of stabilizers coupled to a suspension part, and also includes a clutch mechanism that works to allow the pair of stabilizers to be coupled to and decoupled from each another. The configuration of the clutch mechanism is disclosed in, for example, U.S. Pat. No. 6,428,019 (hereinafter, "D1").

As disclosed in D1, the conventional clutch mechanism includes a housing that supports the pair of stabilizers in such a way as to allow the stabilizers to rotate freely while keeping the stabilizers on the same axis, first and second gears, a coupling member, and an actuator. The first and second gears are engaged with or disengaged from each other by the coupling member caused to slide by the movement of a clutch fork of the actuator. This allows switching between coupling of the stabilizers and decoupling of the same. When the vehicle travels on a flat ground, the stabilizers are coupled to give the diver a comfortable ride with the working suspension. When the vehicle travels on a rough road with irregularities, on the other hand, the stabilizers are decoupled to allow a wheel running on a rock or the like to swing widely. This suppresses a tilt of the vehicle body, thus allowing the vehicle to run past the rock without losing its balance. In the conventional clutch mechanism, the first and second gears and the stabilizers are engaged with each other in the form of spline engagement so as to be able to rotate together. The coupling member includes teeth on its inner peripheral surface, the teeth meshing with the first gear, and is allowed to slide along a rotation axis while meshing with the first gear.

If, in a conventional case, the stabilizers are merely cantilevered on the housing, an unbalanced load acting on the stabilizers makes the stabilizers shaky in a direction perpendicular to the rotation axis of the first and second gears. As a result, respective cores of the stabilizers become misaligned with each other, in which case the coupling member does not slide smoothly and therefore quick coupling and decoupling become impossible. In another example disclosed, where the axes of the stabilizers are aligned by pilot apertures, the length and thickness of the pilot apertures formed on ends of the stabilizers are limited and therefore little piloting effects are expected. This poses a problem that the stabilizers tend to tilt against its axial direction.

SUMMARY

The present invention has been conceived in view of the above current problem, and it is therefore an object of the invention to provide a stabilizer assembly that allows a coupling member to make smooth slide movement.

Another object of the present invention is to provide a stabilizer assembly that constantly maintains a state in which the cores of the stabilizers are aligned with each other while simplifying the support structure of a housing.

The problem to be solved by the present invention is the problem described above and means for solving this problem will be described below.

A stabilizer assembly according to the present invention is a stabilizer assembly for a vehicle including a pair of wheels. The stabilizer assembly includes: a first stabilizer coupled to a suspension part supporting a first wheel of the pair of wheels; a second stabilizer coupled to a suspension part supporting a second wheel of the pair of wheels; and a clutch mechanism capable of selectively creating a first state in which the first and second stabilizers are decoupled from each other and a second state in which the first and second stabilizers are coupled to each other. The clutch mechanism includes a clutch case that supports the first and second stabilizers such that inner ends of the first and second stabilizers are disposed on the same axis; a first engagement portion having engagement grooves formed on an outer periphery of the inner end of the first stabilizer; a second engagement portion having engagement grooves formed on an outer periphery of the inner end of the second stabilizer; an engagement slider that is incapable of rotating relatively to the first and second engagement portions and that is slidable in an axial direction, the engagement slider being capable of switching between an engaged state and a non-engaged state of the first and second engagement portion to each other; and an actuator that slides the engagement slider. The clutch mechanism further includes: a first protrusion having a diameter smaller than a groove-bottom diameter of the engagement grooves, the first protrusion being formed on an end face of the inner end of the first engagement portion; a second protrusion having a diameter that is smaller than the groove-bottom diameter of the engagement grooves but is identical with the diameter of the first protrusion, the second protrusion being formed on an end face of the inner end of the second engagement portion; and a collar fitted on outer peripheral surfaces of the first and second protrusions across a mating point thereof while the first and the second protrusions are set their front ends butted against each other, the collar having an outer diameter size not exceeding a size of the groove-bottom diameter of the engagement grooves.

Further, according to the stabilizer assembly according to the present invention, the clutch case includes: a first bearing that pivotally supports the first stabilizer to allow the first stabilizer to rotate; and a second bearing that pivotally supports the second stabilizer to allow the second stabilizer to rotate. The first stabilizer and the second stabilizer may be pivotally supported by the first bearing, the second bearing, and the collar.

According to the stabilizer assembly according to the present invention, the engagement grooves of the first engagement portion and the engagement grooves of the second engagement portion may be arranged at unequal intervals in a circumferential direction.

An off-road vehicle including the stabilizer assemblies of the present invention for the front wheels and rear wheels may include an axle drive unit that drives axles of the front wheels and those of the rear wheels. The front wheel and the rear wheel may each be equipped with a transmission mechanism including an output shaft connected to the axle of each of the front wheel and the rear wheel, and an input shaft that receives power from the axle drive unit and that is located above the output shaft.

The present invention offers the following effects.

According to the stabilizer assembly of the present invention, the stabilizers have their axes always kept aligned with each other, and the clutch mechanism allows a coupling member to slide smoothly.

In addition, the collar supports the first protrusion of the first stabilizer and the second protrusion of the second stabilizer. The stabilizers, therefore, can be supported without increasing the size of the bearings included in the clutch case.

The above features or other features and effects will be made clear by the following detailed description of the invention that will be made with reference to the accompanying drawings.

BRIEF DESCRIPTION OF THE DRAWINGS

FIG. 8A is a front view of the stabilizer assembly in the engaged state and the off-road vehicle in a case where the ground level difference between the left wheel and the right wheel is small. FIG. 8B is a front view of the stabilizer assembly in the disengaged state and the off-road vehicle in a case where the ground level difference between the left wheel and the right wheel is large.

DETAILED DESCRIPTION

First Embodiment

Figure 1:
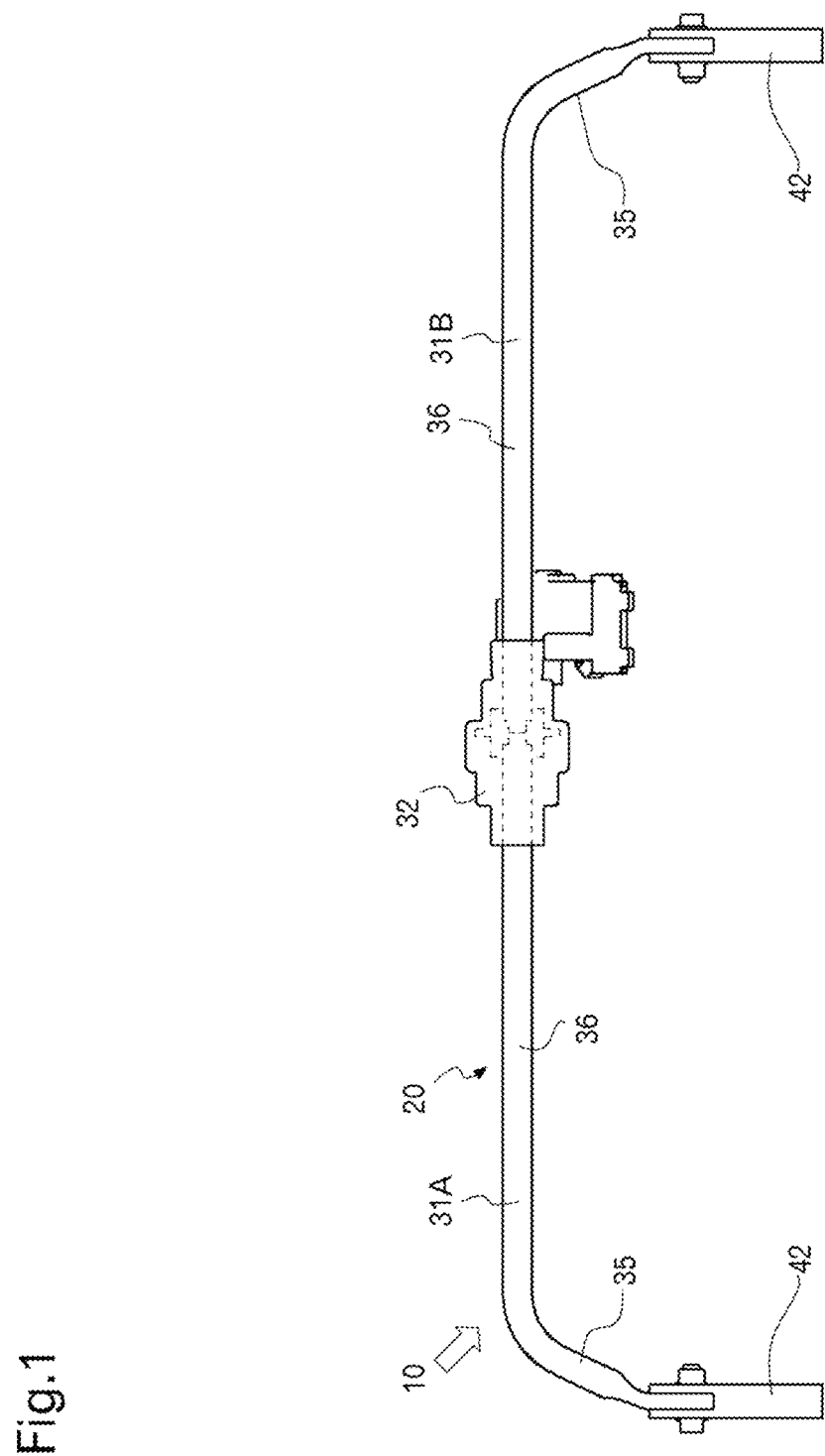
FIG. 1 is a front view of a stabilizer assembly attached to front wheels of a vehicle.

As shown in FIG. 1, a stabilizer assembly 20 according to a first embodiment of the present invention is a device incorporated in an off-road vehicle 10. The stabilizer assembly 20 is attached to arms extending from suspension parts disposed on front wheels 11 of the off-road vehicle 10.

Stabilizer Assembly

As shown in FIG. 1, the stabilizer assembly 20 is a device that suppresses rolling of the off-road vehicle 10, the rolling being caused by variations in the road surface level, when the off-road vehicle 10 is running. The stabilizer assembly 20 includes a first stabilizer 31A, a second stabilizer 31B, and a clutch mechanism 32.

The first stabilizer 31A and the second stabilizer 31B are each formed by bending a rod-like member, and each including an arm segment 35 attached to a suspension part 41, and a body segment 36 extending from the front end of the arm segment 35 in a vehicle width direction. The arm segment 35 includes one end fixed to an arm 42 extending from the suspension part, and the other end continuous with the body segment 36. The body segment 36 includes one end continuous with the arm segment 35, and the other end penetrating a clutch case 51 of the clutch mechanism 32.

Inner ends of the body segments 36 are provided respectively with a first engagement portion 37A and a second engagement portion 37B, and protrusions 38 serving as alignment portions are formed on ends of the first engagement portion 37A and the second engagement portion 37B, respectively. The first and second engagement portions 37A and 37B are each provided with engagement grooves 37c, which mesh with spline teeth 52a formed on the inner peripheral surface of an engagement slider 52.

Figure 2:
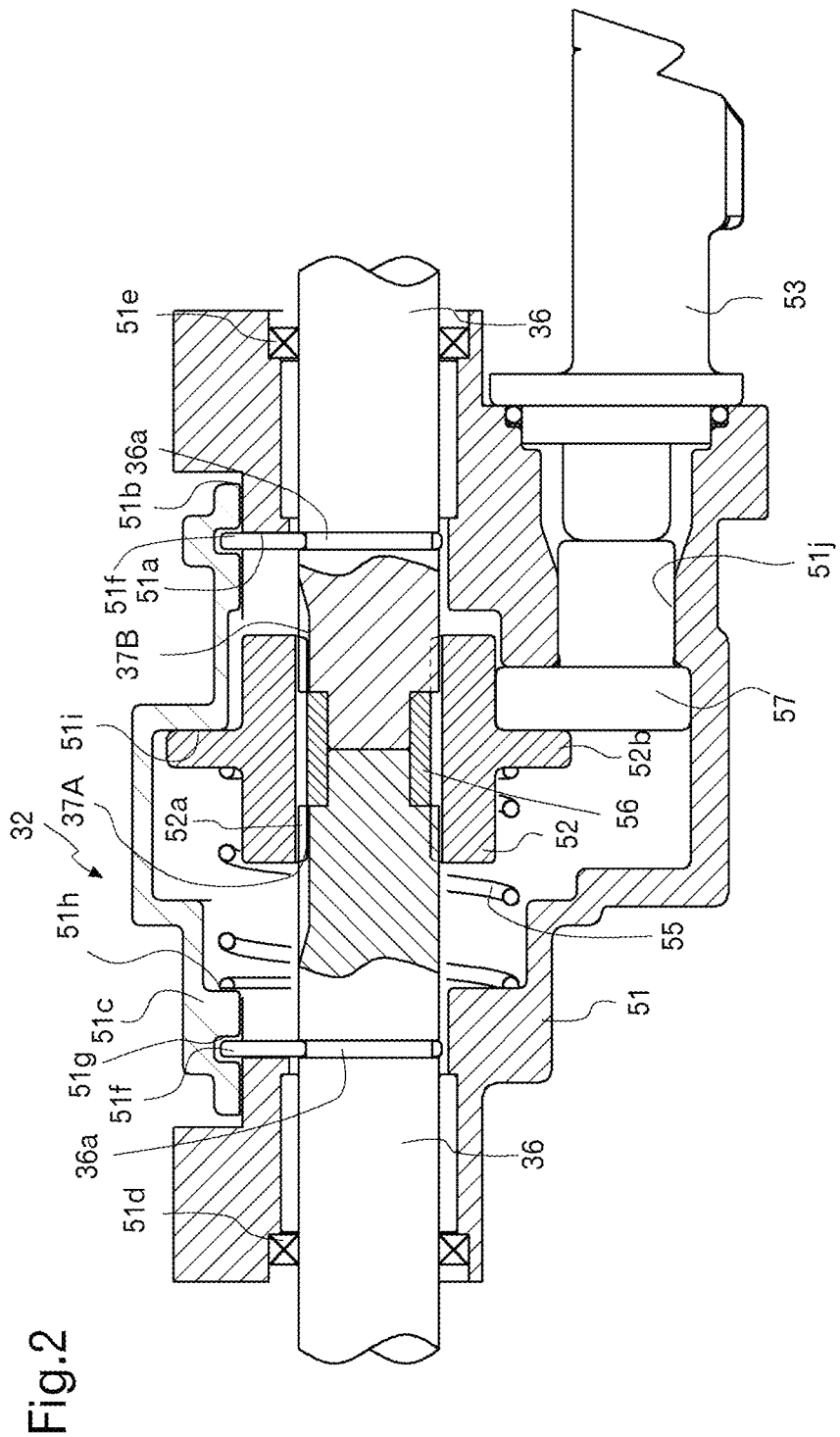
FIG. 2 is a front sectional view of a clutch mechanism in an engaged state according to a first embodiment.
Figure 3:
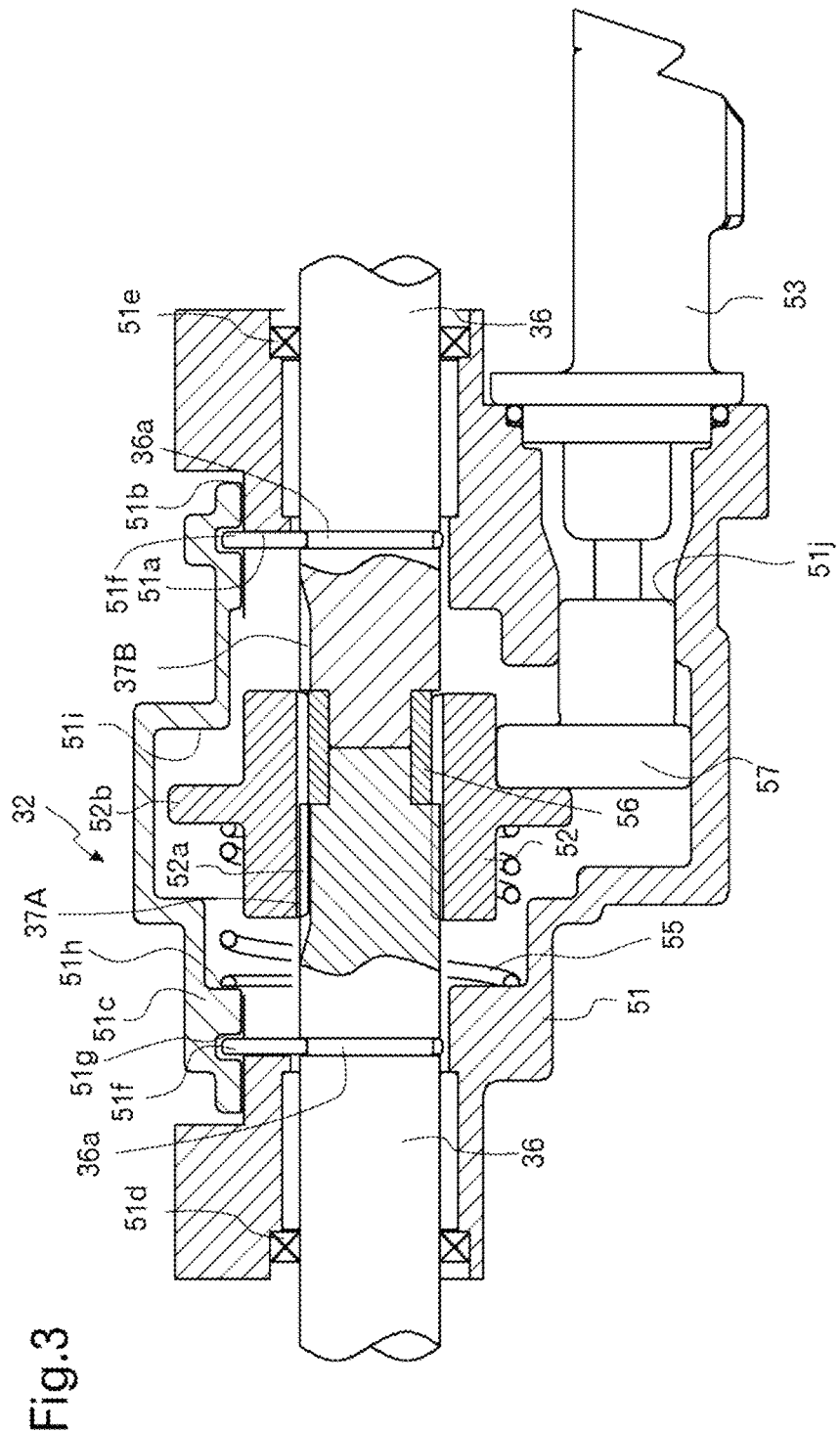
FIG. 3 is a front sectional view of the clutch mechanism in a disengaged state according to the first embodiment.

As shown in FIG. 2 and FIG. 3, the clutch mechanism 32 is a member that selectively creates a first state in which the first and second stabilizers 31A and 31B are decoupled from each other and a second state in which the first and second stabilizers 31A and 31B are coupled to each other. The clutch mechanism 32 includes a clutch case 51 that houses the ends of the first and second stabilizers 31A and 31B, an engagement slider 52 incapable of rotating relative to the first and second engagement portions 37A and 37B and slidable in an axial direction, and an actuator 53 that slides the engagement slider 52.

The clutch case 51 is a member that houses the inner ends of left and right body segments 36, the engagement slider 52, and the actuator 53 and that supports the body segments 36 in such a way as to allow them to rotate about their axes. The clutch case 51 has an assembly hole 51a for assembling components in the central part of the clutch case 51. An edge 51b smaller than other parts in outer peripheral diameter is formed on a side wall around the assembly hole 51a, and a lid 51c that can be attached to the edge 51b is provided.

A left side wall and a right-side wall of the clutch case 51 are provided with a first bearing 51d and a second bearing 51e respectively for pivotally supporting the left and right body segments 36 to allow them to rotate. The first bearing 51d and the second bearing 51e are of the same size corresponding to the shaft diameter of the body segment 36.

Positioning members 51f are fixed to the inner peripheral surface of a cylindrical portion. The positioning members 51f engage with grooves 36a formed on the outer peripheral surfaces of the left and right body segments 36, thereby preventing the body segments 36 from moving in the axial direction. The positioning members 51f are fitted in grooves 51g formed on the inner peripheral surface of the lid 51c. A spring-receiving surface 51h that receives a spring 55, which is an elastic member, is formed on the inner peripheral surface of the cylindrical portion. The spring 55 is a member that urges the engagement slider 52 in an engagement direction.

At the center in the horizontal direction of a part where the body segments 36 and 36 mate with each other, a collar 56 is provide, which is fitted on the outer peripheral surfaces of the first and second protrusions 38 across a mating point thereof. The collar 56 is a cylindrical member having the same diameter from its one end to the other end, and the first and second stabilizers 31A and 31B are pivotally supported by the first bearing 51d, the second bearing 51e, and the collar 56 to be capable of rotating. The inner diameter of the collar 56 substantially matches the outer peripheral diameter of each of the first and second protrusions 38. In this configuration, the collar 56 supports the first and second protrusions 38 such that they are mutually rotatable as their cores match.

The outer diameter of the collar 56 has a set size that does not exceed the groove-bottom diameter of the engagement grooves 37c of the first and second engagement portions 37A and 37B. In this configuration, even when the spline teeth 52a formed on the inner peripheral surface of the engagement slider 52 are on the outer periphery of the collar 56, a gap is formed between the inner peripheral surface of the engagement slider 52 (the tips of the spline teeth 52a) and the outer peripheral surface of the collar. As a result, when the engagement slider 52 slides, the outer surface of the collar 56 is not rubbed against the inner peripheral surface of the engagement slider 52 (the tips of the spline tooth 52a), and therefore the engagement slider 52 makes smooth slide movement in the clutch mechanism 32.

Figure 4:
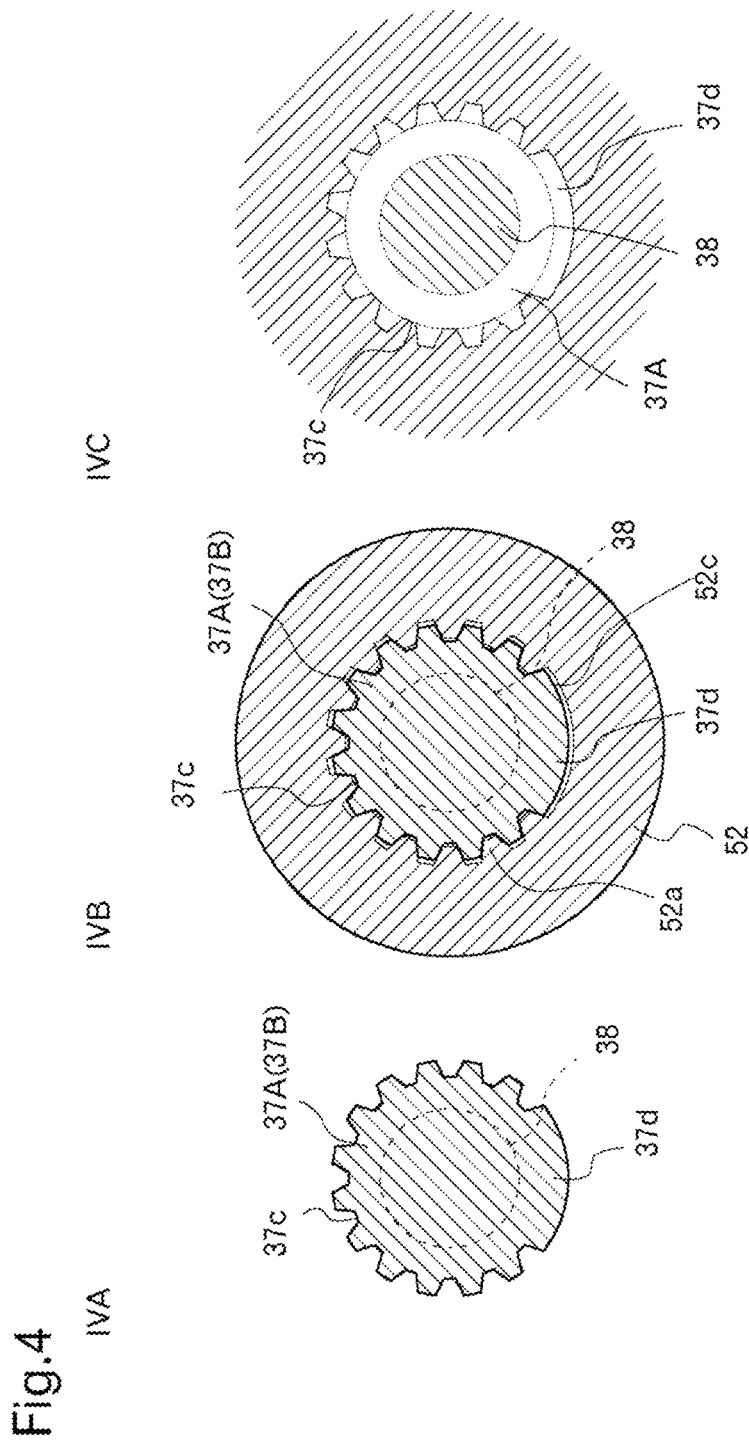
FIG. 4A is an axial sectional view of a first engagement portion according to the first embodiment.
FIG. 4B is an axial sectional view of the first engagement portion and an engagement slider according to the first embodiment.
FIG. 4C is an axial sectional view of a protrusion according to the first embodiment.

As shown in FIG. 2 to FIG. 4, the engagement slider 52 is a cylindrical member including the spline teeth 52a formed on its inner peripheral surface. A spring-receiving portion 52b with a larger diameter is formed on the outer peripheral surface of the engagement slider 52, where the other end of the spring 55 is supported by the spring-receiving portion 52b. The other side surface of the spring-receiving portion 52b can be abutted on an abutment portion 51i formed on the clutch case 51. When the spring-receiving portion 52b abuts on the abutment portion 51i, the engagement slider 52 is engaged with the first and second engagement portions 37A and 37B across a mating point thereof. Thus, in a usual situation, the spring-receiving portion 52b of the engagement slider 52 is pressed against the abutment portion 51i by the spring 55 as the first and second engagement portions 37A and 37B are engaged with the engagement slider 52. As a result, the first and second stabilizers 31A and 31B are connected together.

The actuator 53 is a push-pull electromagnetic solenoid and is attached to the outer peripheral surface of the clutch case 51. The amount of expansion and contraction of the actuator 53 is controlled by a controller (not illustrated). Inside the clutch case 51, a pressing member 57, which comes in contact with the front end of a drive unit of the actuator 53, is supported to be capable of sliding along the axial direction of the body segments 36.

The pressing member 57 is in contact with the other side surface of the spring-receiving portion 52b, and the pressing member 57 having received an axial force applied by the actuator 53 presses the spring-receiving portion 52b to contract the spring 55. When the actuator 53 is driven, the spring 55 is exposed to a force opposing its elastic force and therefore contracts, which allows the first engagement portion 37A only to engage with the engagement slider 52. This leaves the first stabilizer 31A and the second stabilizer 31B capable of rotating independent of each other.

In this configuration, driving the clutch mechanism 32 selectively creates the first state in which the first and second stabilizers 31A and 31B are decoupled from each other and the second state in which the first and second stabilizers 31A and 31B are coupled to each other.

Now, when left and right wheels are on the flat ground surface, respective outer ends of the arm segments 35 and 35 are at the same level from the ground (parallel to each other). Reproducing this reference state when re-engaging the stabilizer assembly after its disengagement requires alignment between the first and second engagement portions 37A and 37B and the engagement slider 52. This alignment will then be described.

As shown in FIG. 4A, FIG. 4B, and FIG. 4C, the spline teeth 52a of the engagement slider 52 are not arranged at equal intervals in the circumferential direction on the inner peripheral surface of the engagement slider 52 because an alignment groove 52c is formed on a part of the inner peripheral surface. The alignment groove 52c in this embodiment has an inner diameter substantially equal to the tooth-bottom diameter of the spline teeth 52a and has a circumferential length larger than the width of each of the spline teeth 52a and is arc-shaped in a sectional view.

Likewise, the engagement grooves 37c on the outer peripheral surface of each of the first and second engagement portions 37A and 37B are not arranged at equal intervals in the circumferential direction on the outer peripheral surface because an alignment projection 37d is formed on a part of the outer peripheral surface, the alignment projection 37d substantially matching the alignment groove 52c.

Figure 5:
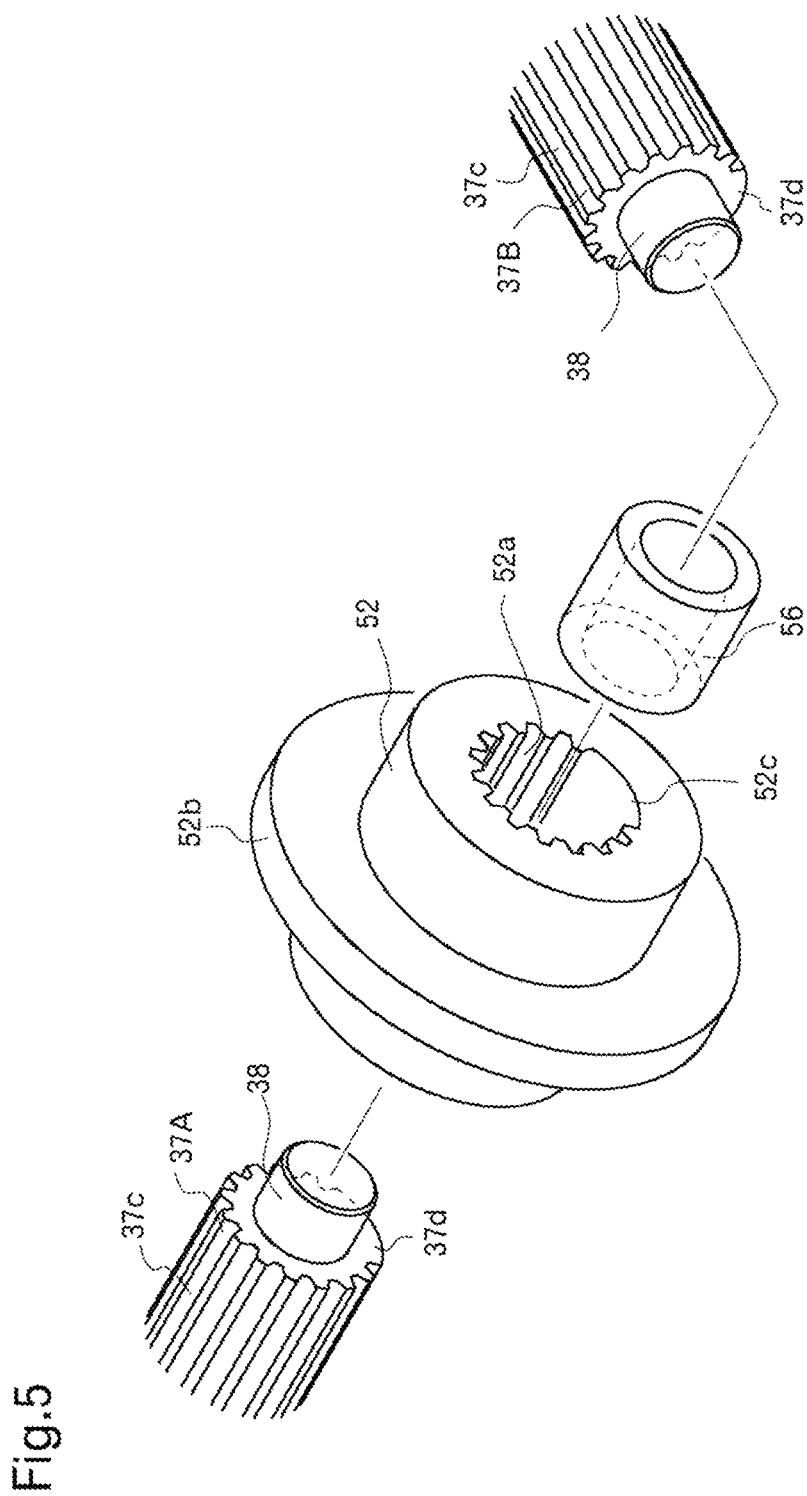
FIG. 5 is a perspective view showing assembly of the first and second engagement portions, the engagement slider, and a collar according to the first embodiment.
Figure 6:
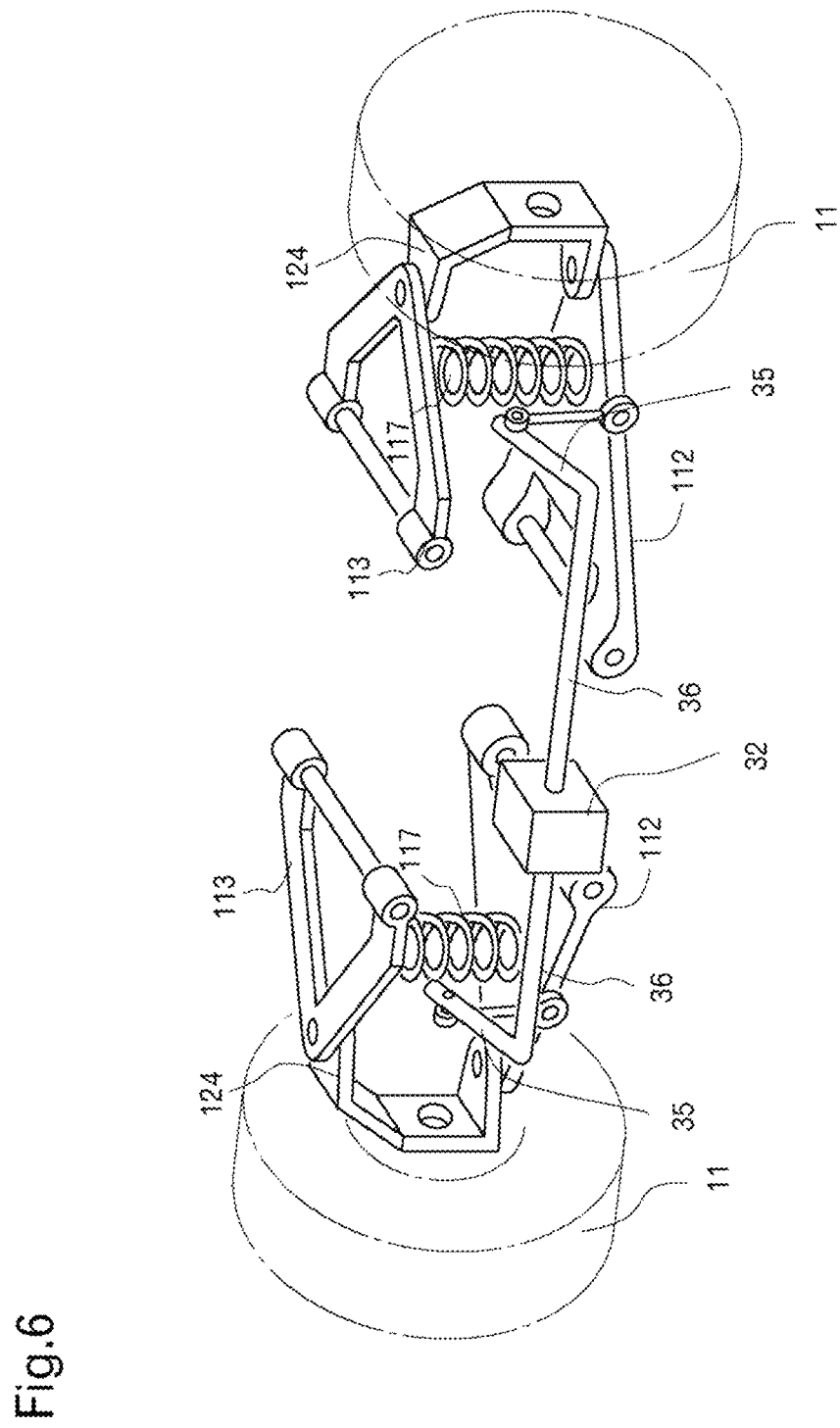
FIG. 6 is a perspective view of the stabilizer assembly attached to the front wheel of the vehicle.

As shown in FIG. 5, to the first and second engagement portions 37A and 37B on the inner ends of the body segments 36 butted against each other, the collar 56 and the engagement slider 52 are fitted. In other words, the engagement slider 52 is fitted on the first and second engagement portions 37A and 37B as they are matched in phase to each other. At the same time, the collar 56 is fitted on the first and second protrusions 38 of the first and second engagement portions 37A and 37B. In this configuration, as the engagement slider 52 is aligned in such a way as to allow its engagement only on one part in the circumferential direction, the first and second engagement portions 37A and 37B, the collar 56, and the engagement slider 52 can be easily fitted together.

Second Embodiment

A modification of the clutch mechanism 32 will then be described with reference to FIG. 9 and FIG. 10. In a second modification described below, the configuration of the engagement slider of the clutch mechanism 32 is different from the configuration of the above-described engagement slider. In the following description, members denoted by the same reference signs as the reference signs of members making up the clutch mechanism 32 of the first embodiment are the same in configuration as those members of the first embodiment, and therefore will not be described in detail in further description.

As shown in FIG. 2 and FIG. 3, the clutch mechanism 32 is a member that selectively creates a first state in which the first and second stabilizers 31A and 31B are decoupled from each other and a second state in which the first and second stabilizers 31A and 31B are coupled to each other. The clutch mechanism 32 includes the clutch case 51 that houses the ends of the first and second stabilizers 31A and 31B, an engagement slider 152 incapable of rotating relative to the first and second engagement portions 37A and 37B and slidable in the axial direction, and the actuator 53 that slides the engagement slider 152.

Figure 9:
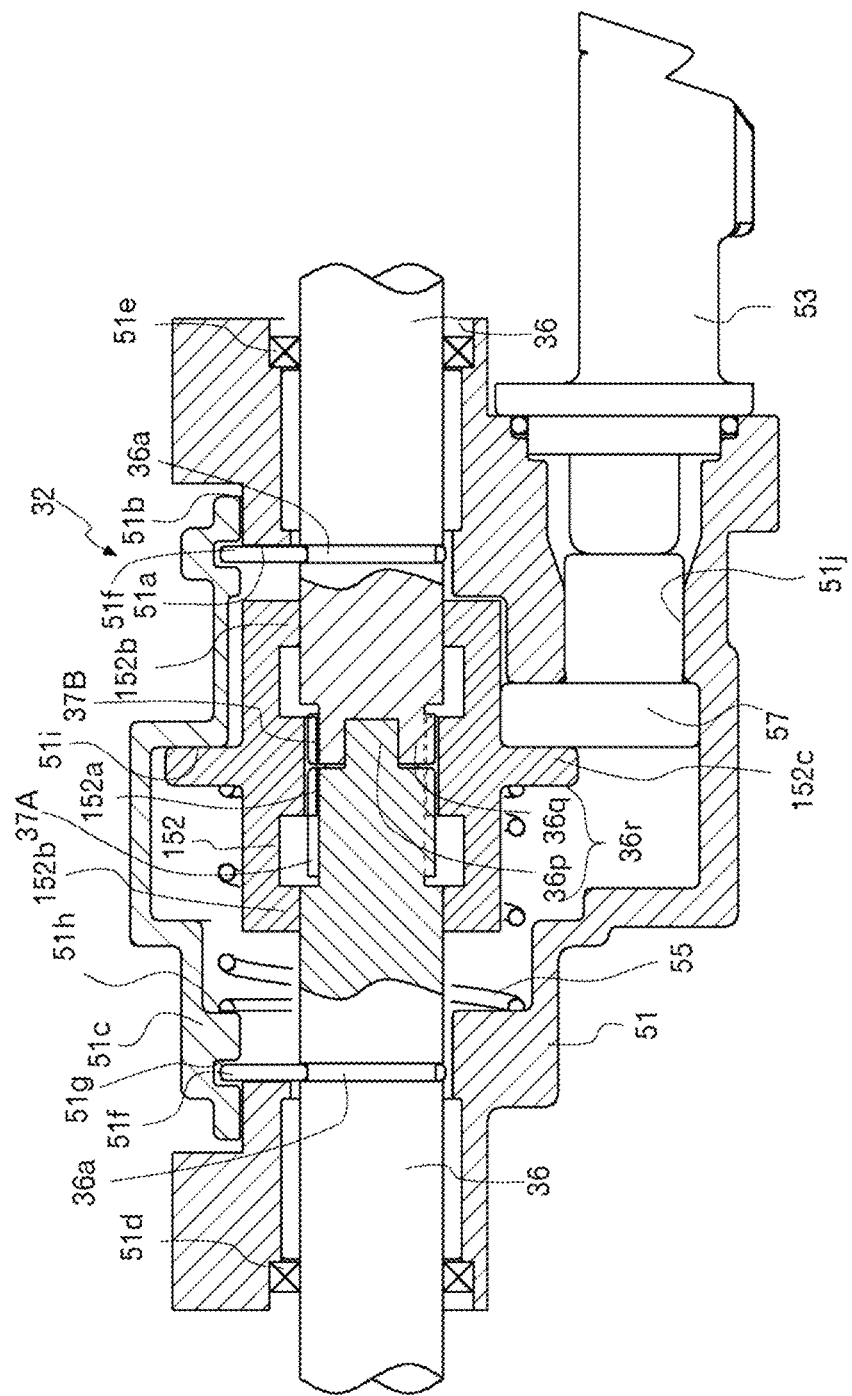
FIG. 9 is a front sectional view of the clutch mechanism in the engaged state according to a second embodiment.
Figure 10:
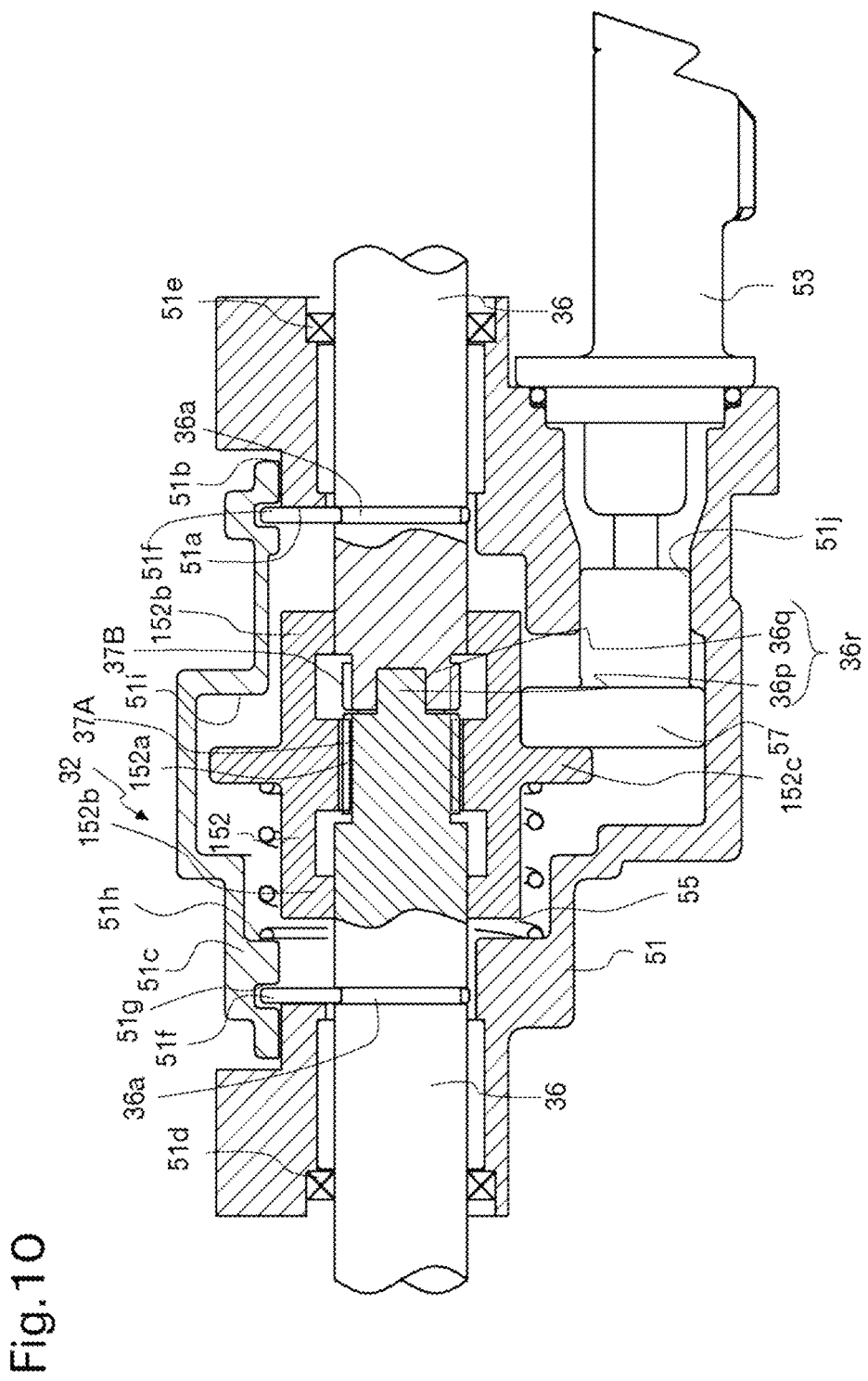
FIG. 10 is a front sectional view of the clutch mechanism in the disengaged state according to the second embodiment.

As shown in FIG. 9 and FIG. 10, the engagement slider 152 is a cylindrical member including an engagement portion 152a including the spline teeth 52a formed on its inner peripheral surface, and pilot guides 152b that come in contact with the outer peripheral surfaces of the body segments 36 and 36 to rotatably support the body segments 36 and 36.

A spring-receiving portion 152c with a larger diameter is formed on the outer peripheral surface of the engagement slider 152, where the other end of the spring 55 is supported by the spring-receiving portion 152c. The other side surface of the spring-receiving portion 152c can be abutted on the abutment portion 51i formed on the clutch case 51. When the spring-receiving portion 152c abuts on the abutment portion 51i, the engagement portion 152a of the engagement slider 152 is engaged with the first and second engagement portions 37A and 37B across the mating point thereof. Thus, in a usual situation, the spring-receiving portion 52b of the engagement slider 52 is pressed against the abutment portion 51i by the spring 55 as the first and second engagement portions 37A and 37B are engaged with the engagement slider 52. As a result, the first and second stabilizers 31A and 31B are connected together.

When the actuator 53 is driven, the spring 55 is exposed to a force opposing its elastic force and therefore contracts, which allows the first engagement portion 37A only to engage with the engagement portion 152a of the engagement slider 152. This leaves the first stabilizer 31A and the second stabilizer 31B capable of rotating independent of each other.

In this configuration, driving the clutch mechanism 32 selectively creates the first state in which the first and second stabilizers 31A and 31B are decoupled from each other and the second state in which the first and second stabilizers 31A and 31B are coupled to each other.

The pilot guides 152b are guide members that suppresses a shift of the body segments 36 and 36 in a direction perpendicular to the axial direction. An axial guide 36r composed of a projection 36p and a recess 36q is formed on butting ends of the body segments 36 and 36. At the axial guide 36r, the projection 36p and the recess 36q are supported in such a way as to be mutually rotatable with their cores matching.

The projection 36p is limited in length and thickness because of a restriction related to layout of the clutch mechanism 32. For this reason, a pilot function the projection 36p and recess 36q offer is not sufficient. The pilot guides 152b are thus additionally provided as auxiliary guiding members.

The pilot guides 152b are formed on both ends of the engagement slider 152, respectively. The pilot guides 152b are always in contact with the outer peripheral surfaces of the body segments 36 and 36, regardless of whether the engagement slider 152 is in the engaged state or disengaged state. In this configuration, the guide function of the axial guide 36r and that of the pilot guides 152b are combined, which allows supporting the projection 36p and the recess 36q in such a way as to be mutually rotatable with their cores matching.

The off-road vehicle 10 of a four-wheel drive type equipped with the stabilizer assembly 20 according to the embodiments will then be described.

As shown in FIG. 7A, FIG. 7B, FIG. 8A, and FIG. 8B, the off-road vehicle 10 is equipped with an axle drive unit 115 that drives left and right front wheels 11. A suspension of each of the front wheels 11 includes the stabilizer assembly 20 built in the suspension, the stabilizer assembly 20 controlling the movement of the front wheel 11. The rear wheels have the same configuration as this configuration of the front wheels 11, which is not illustrated. In this embodiment, for simpler description, a configuration of the axle drive unit 115 that drives the front wheels 11 will be described.

FIG. 7 depicts the off-road vehicle 10 configured to run at high speed mainly on a relatively flat road surface. In this off-road vehicle 10, each front wheel 11 is equipped with a transmission mechanism 121 including an output shaft 122 connected to an axle 118, and an input shaft 123 that receives power from the axle drive unit 115 and that is located above the output shaft 122. Through this configuration, a minimum above-ground height A is set.

The transmission mechanism 121 is a device that transmits power from the axle drive unit 115 to the front wheel 11. In the transmission mechanism 121, the input shaft 123, which receives power from the axle drive unit 115, and the output shaft 122, which transmits power from the input shaft 123 along a different axes, are connected via a constant speed universal joint 116. The axle 118 connected to the output shaft 122 pivotally supports the front wheel 11.

The off-road vehicle 10 includes a lower arm 112 and an upper arm 113 disposed on both left and right sides of the vehicle body, where the lower arm 112 and upper arm 113 connect to a wheel support member 124, which rotatably supports the front wheel 11, in such a way as to allow the wheel support member 124 to swing vertically relative to the vehicle body.

An end on an outer side (side closer to the front wheel 11) of the lower arm 112 is connected to the lower end of the wheel support member 124 by a joint 114, while an end on an inner side (closer to the center of the vehicle body) of the same is connected to a lower part of the vehicle body in such a way as to be capable of swinging vertically at two points about an axis along the longitudinal direction of the vehicle body. An end on the outer side of the upper arm 113 is connected to the upper end of the wheel support member 124 by the joint 114. The constant speed universal joint 116 is disposed between the upper arm 113 and the lower arm 112.

Being configured in this manner, the left and right front wheels 11 can be driven as they move vertically independent of each other.

A suspension 117 is connected to a middle part of the lower arm 112. One end of the suspension 117 is rotatably supported by the middle part of the lower arm 112 connected to the wheel support member 124. In this configuration, the suspension 117 absorbs the vertical movement of the lower arm 112, which prevents rolling of the vehicle body caused by the vertical movement of the front wheel 11.

The arm segment 35 of each of the first and second stabilizers 31A and 31B is attached to a middle part of the lower arm 112. The body segment 36 includes one end continuous with the arm segment 35, and the other end penetrating a clutch case 51 of the clutch mechanism 32.

The suspension 117 is connected to the middle part of the lower arm 112, the suspension 117 being connected to the vehicle body. The suspension 117 includes a buffer spring and an extensible rod, and absorbs vibrations caused by the upward/downward movement of the wheel.

Figure 7A:
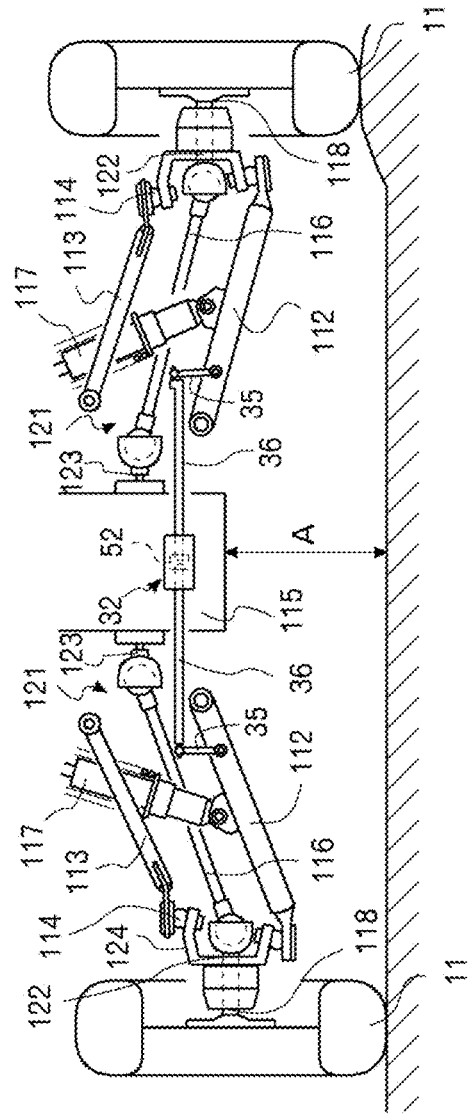
FIG. 7A is a front view of the stabilizer assembly in an engaged state and an off-road vehicle in a case where a ground level difference between a left wheel and a right wheel is small.

As shown in FIG. 7A, when the vehicle travels on a relatively flat road surface, the driver operates a suspension on/off switch (not illustrated) disposed on the driver's seat of the vehicle to put the clutch mechanism 32 in the engaged state, thus putting the first and second stabilizers 31A and 31B in the second state of being coupled to each other. In this state, the stabilizer assembly 20 is twisted to deform elastically, and a restoring torque corresponding to an amount of torsional deformation of the stabilizer assembly 20 is generated. This creates a tight suspension state in which, in particular, the wobble of the vehicle at it is clearing a corner at high speed is suppressed.

Figure 7B:
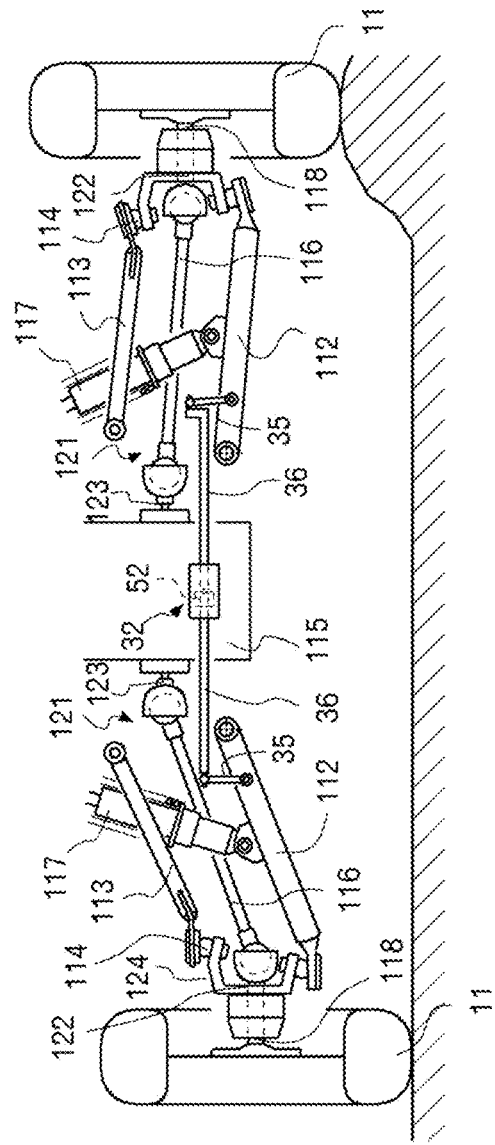
FIG. 7B is a front view of the stabilizer assembly in a disengaged state and the off-road vehicle in a case where the ground level difference between the left wheel and the right wheel is large.

As shown in FIG. 7B, when the vehicle travels on a rough road, the driver operates the suspension on/off switch (not illustrated) to put the clutch mechanism 32 in the disengaged state, thus putting the first and second stabilizers 31A and 31B in the first state of being disengaged from each other. In this state, the stabilizer assembly 20 does not function, thus creating a loose suspension state. This allows the vehicle to run over a place with a large level difference while keeping the vehicle body stable.

The off-road vehicle 10 shown in FIG. 8A and FIG. 8B is a high-clearance model that travels mainly on rough roads found in a mountainous area, etc. In this off-road vehicle 10, the output shaft 122 and the axle 118 are disposed on different axes so that the output shaft 122 is located above the axle 118. A power transmission mechanism 125 of a parallel gear type is attached to the front end of the output shaft 122, and the axle 118 is connected to an output-side gear of the power transmission mechanism. Power from the output shaft 122 is transmitted to the axle 118 via the power transmission mechanism 125. An offset distance B between the output shaft 122 and the axle 118 is added to the minimum above-ground height A shown in FIG. 7A and FIG. 7B to set a minimum above-ground height (A+B).

As shown in FIG. 8A, when the vehicle travels on a flat road surface, the clutch mechanism 32 is put in the engaged state to create the tight suspension state, which improves the traveling stability of the high-clearance model vehicle with its center of gravity set relatively high.

As shown in FIG. 8B, when the vehicle travels on a rough road, the clutch mechanism 32 is put in the disengaged state to create the loose suspension state. This allows the vehicle to run over a place with a large level difference while keeping the vehicle body stable.

As described above, the stabilizer assembly 20 according to the present invention is the stabilizer assembly 20 for the vehicle including the pair of front wheels 11 and 11. The stabilizer assembly 20 includes: the first stabilizer 31A coupled to the suspension part 41 supporting the first wheel 11 of the pair of wheels 11 and 11; the second stabilizer 31B coupled to the suspension part 41 supporting the second wheel 11 of the pair of wheels 11 and 11; and the clutch mechanism 32 capable of selectively creating the first state in which the first and second stabilizers 31A and 31B are decoupled from each other and the second state in which the first and second stabilizers 31A and 31B are coupled to each other. The clutch mechanism 32 includes: the clutch case 51 that supports the first and second stabilizers 31A and 31B such that the inner ends of the first and second stabilizers 31A and 31B are disposed on the same axis; the first engagement portion 37A having the engagement grooves 37c formed on the outer periphery of the inner end of the first stabilizer 31A; the second engagement portion 37B having the engagement grooves 37c formed on the outer periphery of the inner end of the second stabilizer 31B; the engagement slider 52 that is incapable of rotating relatively to the first and second engagement portions 37A and 37B and that is slidable in the axial direction, the engagement slider 52 being capable of switching between the engaged state and the non-engaged state of the first and second engagement portion 37A and 37B to each other; and the actuator 53 that slides the engagement slider 52. The clutch mechanism 32 further includes: the first protrusion 38 having the diameter smaller than the groove-bottom diameter of the engagement grooves 37c, the first protrusion 38 being formed on the end face of the inner end of the first engagement portion 37A; the second protrusion 38 having a diameter that is smaller than the groove-bottom diameter of the engagement grooves 37c but is identical with the diameter of the first protrusion 38, the second protrusion 38 being formed on the inner end of the second engagement portion 37B; and the collar 56 fitted on outer peripheral surfaces of the first and second protrusions 38 and 38 across the mating point thereof while the first and the second protrusions 38 and 38 are set their front ends butted against each other, the collar 56 having the outer diameter size not exceeding the size of the groove-bottom diameter of the engagement grooves 37c.

In this configuration, the collar 56 pivotally supports the first protrusion 38 and the second protrusion 38 to allow them to rotate. Even when an unbalanced load acts on the first and second stabilizers 31A and 31B, therefore, the first and second stabilizers 31A and 31B are always kept in a state of their cores being aligned with each other. Because the outer diameter size of the collar 56 does not exceed the size of the groove-bottom diameter of the engagement grooves 37c, the surface of the collar 56 is not brought into contact with the inner peripheral surface of the engagement slider 52 when the engagement slider 52 slides. In the clutch mechanism 32, therefore, the engagement slider 52 makes smooth slide movement.

The collar 56 supports the first protrusion 38 of the first stabilizer 31A and the second protrusion 38 of the second stabilizer 31B. The first and second stabilizers 31A and 31B, therefore, can be supported without complicating a support structure in the clutch case 51.

The clutch case 51 may include the first bearing 51d pivotally supporting the first stabilizer 31A to allow the first stabilizer 31A to rotate and the second bearing 51e pivotally supporting the second stabilizer 31B to allow the second stabilizer 31B to rotate, the first bearing 51d and the second bearing 51e being disposed respectively on the left and right side walls of the clutch case 51, and the first and second stabilizers 31A and 31B may be pivotally supported by the first bearing 51d, the second bearing 51e, and the collar 56.

In this configuration, in which the first and second stabilizers 31A and 31B are pivotally supported by the first bearing 51d, the second bearing 51e, and the collar 56, the first and second stabilizers 31A and 31B are pivotally supported without using a large bearing. This allows a reduction in the size of a bearing structure.

The spline teeth 52a and the engagement grooves 37c are of the shape and are arranged at unequal intervals in the circumferential direction.

In this configuration, the engagement slider 52 can be fitted as the first and second engagement portions 37A and 37B are matched in phase.

The off-road vehicle 10 including the stabilizer assemblies 20 for the front wheels 11 and the rear wheels include the axle drive unit 115 that drives the axles 118 of the front wheels 11 and those of the rear wheels. The front wheel 11 and the rear wheel may each be equipped with the transmission mechanism 121 including the output shaft 122 connected to the axle 118 of each of the front wheel and the rear wheel, and the input shaft 123 that receives power from the axle drive unit 115 and that is located above the output shaft 122.

In this configuration, when the vehicle travels on a rough road, the clutch mechanism 32 is put in the disengaged state to create the loose suspension state. This allows the vehicle to run over a place with a large level difference while keeping the vehicle body stable.

When the vehicle travels on a flat road surface, the clutch mechanism 32 is put in the engaged state to create the tight suspension state, which improves the traveling stability of the high-clearance model vehicle with its center of gravity set relatively high.

Specific embodiments of the present invention have been described above. These embodiments may be modified in various forms providing that the modification does not depart from the spirit of the present invention. The appended claims are intended to cover applications of the present invention that fall within the true scope and spirit of the invention.

All embodiments described herein, therefore, should be considered as exemplary one and should not be considered as restrictive one. The scope of the present invention is indicated more clearly in the following claims than in the above description made herein, and any modification that is equivalent to what is claimed herein or falls within what is covered by the claims should be included in the scope of the present invention.

What is claimed is:

1. A stabilizer assembly for a vehicle including a pair of wheels, the stabilizer assembly comprising:
   a first stabilizer coupled to a suspension part supporting a first wheel of the pair of wheels;
   a second stabilizer coupled to a suspension part supporting a second wheel of the pair of wheels; and
   a clutch mechanism capable of selectively creating a first state in which the first and second stabilizers are decoupled from each other and a second state in which the first and second stabilizers are coupled to each other,
   wherein
   the clutch mechanism includes:
      a clutch case that supports the first and second stabilizers such that inner ends of the first and second stabilizers are disposed on the same axis;
      a first engagement portion having engagement grooves formed on an outer periphery of the inner end of the first stabilizer;
      a second engagement portion having engagement grooves formed on an outer periphery of the inner end of the second stabilizer;
      an engagement slider that is incapable of rotating relatively to the first and second engagement portions and that is slidable in an axial direction, the engagement slider being capable of switching between an engaged state and a non-engaged state of the first and second engagement portion to each other;
      an actuator that slides the engagement slider;
      a first protrusion having a diameter smaller than a groove-bottom diameter of the engagement grooves, the first protrusion being formed on an end face of the inner end of the first engagement portion;
      a second protrusion having a diameter that is smaller than the groove-bottom diameter of the engagement grooves but is identical with the diameter of the first protrusion, the second protrusion being formed on the inner end of the second engagement portion; and
      a collar fitted on outer peripheral surfaces of the first and second protrusions across a mating point thereof while the first and the second protrusions are set their front ends butted against each other, the collar having an outer diameter size not exceeding a size of the groove-bottom diameter of the engagement grooves.

2. The stabilizer assembly for a vehicle including a pair of wheels according to claim 1, wherein
   the clutch case includes a first bearing that pivotally supports the first stabilizer to allow the first stabilizer to rotate and a second bearing that pivotally supports the second stabilizer to allow the second stabilizer to rotate, the first bearing and the second bearing being disposed respectively on both side walls of the clutch case, and
   the first stabilizer and the second stabilizer are pivotally supported by the first bearing, the second bearing, and the collar.

3. The stabilizer assembly for a vehicle including a pair of wheels according to claim 1, wherein
   the engagement grooves of the first engagement portion and the engagement grooves of the second engagement portion are of the same shape and are arranged at unequal intervals in a circumferential direction.

4. A stabilizer assembly for a vehicle including a pair of wheels, the stabilizer assembly comprising:
   a first stabilizer coupled to a suspension part supporting a first wheel of the pair of wheels;
   a second stabilizer coupled to a suspension part supporting a second wheel of the pair of wheels; and
   a clutch mechanism capable of selectively creating a first state in which the first and second stabilizers are decoupled from each other and a second state in which the first and second stabilizers are coupled to each other,
   wherein
   the clutch mechanism includes:
      a clutch case that supports the first and second stabilizers such that inner ends of the first and second stabilizers are disposed on the same axis;
      a first engagement portion having engagement grooves formed on an outer periphery of the inner end of the first stabilizer;
      a second engagement portion having engagement grooves formed on an outer periphery of the inner end of the second stabilizer;
      an engagement slider that is incapable of rotating relatively to the first and second engagement portions and that is slidable in an axial direction, the engagement slider being capable of switching between an engaged state and a non-engaged state of the first and second engagement portion to each other;
      an actuator that slides the engagement slider;
      an axial guide formed on the inner end faces of the first and second stabilizers, the axial guide supporting the first and second stabilizers in such a way as to allow the first and second stabilizers to rotate relative to each other; and
      a pilot guide that makes the engagement slider a single part, the pilot guide supporting the first and second stabilizers via the engagement slider in such a way as to allow the first and second stabilizers to rotate relative to each other, regardless of whether the engagement slider is in a slide position for an engaged state or a slide position for a disengaged state.

* * * * *